(12) United States Patent
Kuehl et al.

(10) Patent No.: US 9,896,520 B2
(45) Date of Patent: Feb. 20, 2018

(54) METHODS FOR CONTROLLING ALUMINUM ALKYL FEED TO A SLURRY POLYMERIZATION PROCESS

(71) Applicant: Basell Polyolefine GmbH, Wesseling (DE)

(72) Inventors: Reinhard Kuehl, Bornheim (DE); Rodrigo Carvajal, Bonn (DE); Gerhardus Meier, Frankfurt (DE); Elke Damm, Bad Vilbel (DE); Phil Pyman, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/305,047

(22) PCT Filed: Apr. 28, 2015

(86) PCT No.: PCT/EP2015/059119
§ 371 (c)(1),
(2) Date: Oct. 18, 2016

(87) PCT Pub. No.: WO2015/165861
PCT Pub. Date: Nov. 5, 2015

(65) Prior Publication Data
US 2017/0183427 A1    Jun. 29, 2017

(30) Foreign Application Priority Data

Apr. 28, 2014   (EP) ..................................... 14166219

(51) Int. Cl.
*C08F 10/02*       (2006.01)
*C08F 2/14*        (2006.01)
*C08F 4/642*       (2006.01)
*B01J 19/18*       (2006.01)

(52) U.S. Cl.
CPC .......... *C08F 10/02* (2013.01); *C08F 2400/02* (2013.01)

(58) Field of Classification Search
CPC ......... C08F 2/14; C08F 10/02; C08F 2400/02
USPC ............................................ 526/65, 69, 919
See application file for complete search history.

(56) References Cited

U.S. PATENT DOCUMENTS 6,355,742 B1    3/2002  Oh et al.

FOREIGN PATENT DOCUMENTS

WO    WO 9952952 A1    10/1999

OTHER PUBLICATIONS

PCT International Search Report & Written Opinion dated May 20, 2015 for PCT/EP2015/059119.

*Primary Examiner* — Fred M Teskin (57) ABSTRACT

The present disclosure generally relates to a slurry polymerization process for the preparation of polyethylene in the presence of a Ziegler catalyst and aluminum alkyl co-catalyst in at least one polymerization reactor, in which process suspension medium comprising a concentration of aluminum alkyl co-catalyst is recycled to the polymerization, the concentration of aluminum alkyl co-catalyst in the recycled suspension medium is determined; and the amount of fresh aluminum alkyl co-catalyst fed to the polymerization is adjusted to maintain a targeted aluminum alkyl co-catalyst concentration in the recycled suspension medium.

20 Claims, 2 Drawing Sheets

METHODS FOR CONTROLLING ALUMINUM ALKYL FEED TO A SLURRY POLYMERIZATION PROCESS

This application is the U.S. National Phase of PCT International Application PCT/EP2015/059119, filed Apr. 28, 2015, claiming benefit of priority to European Patent Application No. 14166219.7, filed Apr. 28, 2014, the disclosures of which are incorporated herein by reference in their entirety.

FIELD OF THE INVENTION

The present disclosure relates to a process for feed control in an ethylene polymerization process. In some embodiments, the present disclosure relates to a process for controlling the feed of aluminum alkyl compounds to an ethylene slurry polymerization process for maintaining constant yields and selectivities.

BACKGROUND OF THE INVENTION

Polyethylenes are categorized according to their densities, which are may be used as a guide to end-use applications. For example, high density polyethylene (HDPE) has a low degree of branching, which results in a compact structure having high tensile strength. HDPE is used in products such as pipes and drums. Medium density polyethylene (MDPE) has a high degree of chemical resistance as well as shock and drop resistance, and may be used in products such as shrink films. Low density polyethylene (LDPE) possesses random long chain branching, with "branches on branches." LDPE can provide good resistance to high temperatures and impact, and has been used in applications such as cling films and squeezable bottles. Linear low density polyethylene (LLDPE) has an essentially linear structure but also has low density because of its short chain branching, and is used in applications such as stretch films and coatings for cables.

Various processes can be used to produce polyethylene. In ethylene slurry polymerization processes, diluents such as hexane are used to dissolve the ethylene monomer, comonomers and hydrogen, and the monomer(s) are polymerized with a catalyst. Following polymerization, the polymer product formed is present as a slurry suspended in the liquid medium. In typical multi-reactor cascade processes such as those disclosed, e.g., in WO 2012/028591 A1, U.S. Pat. No. 6,204,345 B1, and WO 2005/077992 A1, monomer(s), hydrogen, catalyst and diluent are fed into the first of three reactors where a slurry forms from the polymer particles contained within the diluent and unreacted monomer. The reactors can be operated in parallel or in series, and the types/amounts of monomer and conditions can be varied in each reactor to produce a variety of polyethylene materials, including unimodal (molecular weight distribution) or multimodal polyethylene material. Such multimodal compositions are used in a variety of applications; e.g., WO 2012/069400 A1 discloses trimodal polyethylene compositions for blow moldings.

Ziegler type catalysts have been used in ethylene polymerization processes. These catalysts may use aluminum alkyl compounds as co-catalyst activators to activate titanium or vanadium sites on the catalyst. The amount of co-catalyst present in the reactor may determine the yields and selectivities of the ethylene slurry polymerization process, e.g. in multi-reactor systems, where different polymers can be produced in each reactor, but the same co-catalyst flows to each reactor in turn.

Various compounds, such as oxygen-containing polar molecules, can poison Ziegler type catalysts, degrading their yields and selectivities, as described, for example, in WO 95/07941 A1, WO 96/39450 A1, WO 2004/085488 A2, and EP 0 206 794 A1. This can occur, e.g., when the poisons interact with either the $TiCl_4$ or the $MgCl_2$ support of the catalyst. Aluminum alkyls such as triethylaluminum, trimethylaluminum, tri-isobutylaluminum and tri-n-hexylaluminum can be used as scavengers of poisons in polymerization solutions, as described in WO 2004/085488 A2. However, these aluminum alkyl materials are also co-catalysts for the catalyzed polymerization, as described above, so that the process of scavenging catalyst poisons changes the availability of the aluminum alkyl co-catalyst for ethylene polymerization.

Conventional ethylene polymerization processes may target an Al/Ti ratio in the reactor because the content of the aluminum alkyl co-catalyst may affect the activity of the catalyst and the properties of the produced polyethylene. However, when the content of oxygen-containing poisons in the feed varies, the effective Al/Ti ratio also changes because the level of active aluminum is reduced as the aluminum alkyl co-catalyst reacts with the oxygen-containing poisons. This reaction results in altered reactor yields and product properties. Moreover, polymerization plants periodically change catalysts to produce grades of polyethylene targeted for different end-use applications, e.g., switching from an injection molding grade to a film grade. Such catalysts may have different sensitivities toward poisons and toward changing levels of effective aluminum alkyl co-catalyst(s). Even more demanding is the situation where multiple slurry reactors are operated in series, where an active catalyst within the polyethylene product flows from reactor to reactor, and ethylene is fed to each reactor, but fresh aluminum alkyl co-catalyst is fed only to the first reactor. Therefore, a continuing need exists for ethylene polymerization processes that minimize the adverse effects on reactor yields and selectivities of changing feed contaminants.

SUMMARY OF THE INVENTION

The present disclosure generally relates to processes for ethylene slurry polymerization where the aluminum alkyl co-catalyst feed is controlled.

In some embodiments, a slurry polymerization process for the preparation of polyethylene in a one polymerization reactor set-up or in a reactor cascade of two or more polymerization reactors is provided, comprising the steps of:
a) feeding ethylene, a Ziegler catalyst, fresh aluminum alkyl co-catalyst and a diluent selected from fresh diluent, recycled suspension medium comprising a concentration of aluminum alkyl, and mixtures thereof, and optionally amounts of hydrogen and optionally amounts of one or more $C_3$ to $C_{10}$ alpha-olefins to a polymerization reactor;
b) contacting in the polymerization reactor at a reactor temperature from 60° C. to 95° C. and a reactor pressure from 0.15 MPa to 3 MPa, the ethylene, the Ziegler catalyst, the fresh aluminum alkyl co-catalyst, the diluent and optionally the hydrogen and the $C_3$ to $C_{10}$ alpha-olefins to form a slurry product comprising polyethylene and a suspension medium;
c) withdrawing the slurry product from the polymerization reactor;
d) optionally feeding the slurry product to a second polymerization reactor of the reactor cascade, feeding additional amounts of ethylene, diluent selected from fresh diluent, recycled suspension medium comprising a concentration of aluminum alkyl co-catalyst, and mixtures thereof, and optionally additional amounts of hydrogen and of $C_3$ to $C_{10}$ alpha-olefins to the polymerization reactor;

contacting in the polymerization reactor at a reactor temperature from 60° C. to 95° C. and a reactor pressure from 0.15 MPa to 3 MPa, the slurry product fed to the polymerization reactor and the additional amounts of ethylene, diluent, and optionally hydrogen and $C_3$ to $C_{10}$ alpha-olefins, thereby forming an additional amount of polyethylene in the slurry product;

and withdrawing the slurry product from the polymerization reactor;

e) optionally feeding the slurry product obtained in step d) to a third polymerization reactor of the reactor cascade and repeating the activities of step d);

f) optionally repeating step e) for additional polymerization reactors of the reactor cascade;

g) feeding the slurry product withdrawn from the polymerization reactor of the one polymerization reactor set-up or from the last polymerization reactor of the reactor cascade to a separator;

h) separating in the separator the particulate polyethylene from the suspension medium;

i) recycling at least a part of the suspension medium separated from the slurry product in the separator as recycled suspension medium to the polymerization reactor of the one polymerization reactor set-up or to at least one polymerization reactor of the reactor cascade;

j) determining the concentration of aluminum alkyl co-catalyst in the recycled suspension medium; and k) adjusting the amount of fresh aluminum alkyl co-catalyst fed to the polymerization reactor of the one polymerization reactor set-up or to the first polymerization reactor of the reactor cascade to maintain a targeted aluminum alkyl co-catalyst concentration in the recycled suspension medium.

DETAILED DESCRIPTION OF THE INVENTION

The present disclosure describes a process for advantageously controlling the concentration of aluminum alkyl co-catalyst in a suspension medium, which is recycled to the ethylene slurry polymerization reactor system. In some embodiments, the technology disclosed herein allows one to better maintain reactor yields and selectivities, even under challenging conditions including but not limited to variations in reactor grades and/or catalyst poison levels.

The process of the present disclosure relates to a slurry polymerization process for the preparation of polyethylene comprising feeding defined amounts of ethylene, a Ziegler catalyst, fresh aluminum alkyl co-catalyst and a diluent which is selected from fresh diluent, a recycled suspension medium and mixtures thereof, and optionally amounts of hydrogen and optionally amounts of $C_3$ to $C_{10}$ alpha-olefins as comonomers to a reactor. The reactor can be a single reactor in a one polymerization reactor set-up or the first reactor of a reactor cascade. The ethylene, the Ziegler catalyst, the fresh aluminum alkyl co-catalyst, the diluent and the optional comonomer and hydrogen are reacted in a reactor slurry at a reactor temperature from 60° C. to 95° C. and a reactor pressure from 0.15 MPa to 3 MPa. The feed of the fresh aluminum alkyl co-catalyst to the polymerization reactor is adjusted to maintain a targeted aluminum alkyl co-catalyst concentration in the recycled suspension medium.

Polyethylene Slurry Production Process

The process to produce polyethylene uses ethylene in a slurry polymerization in the presence of a catalyst, a diluent, such as hexane or isobutane, and optionally, hydrogen and one or more comonomers. The polymerization proceeds in a suspended slurry formed from polymer particles in the diluent, unreacted monomer and catalyst. Polyethylene polymers obtained by the process described in the present disclosure can be ethylene homopolymers or copolymers of ethylene containing up to 40 wt. % of $C_3$-$C_{10}$-1-alkenes. The comonomers may be chosen from 1-butene, 1-pentene, 1-hexene, 1-octene or mixtures thereof. The slurry polymerization process is at reactor temperatures from 60° C. to 95° C. or in the alternative from 65° C. to 90° C., or from 70° C. to 85° C., and at reactor pressures from 0.15 MPa to 3 MPa, or in the alternative from 0.2 MPa to 2 MPa, or from 0.25 MPa to 1.5 MPa.

The polyethylene slurry production process may be carried out in at least one polymerization reactor. Accordingly, in one embodiment, the subject matter of the present disclosure relates to a slurry polymerization process for the preparation of polyethylene comprising:

a) feeding ethylene, a Ziegler catalyst, fresh aluminum alkyl co-catalyst and a diluent selected from fresh diluent, recycled suspension medium comprising a concentration of aluminum alkyl co-catalyst, and mixtures thereof, and optionally amounts of hydrogen and optionally amounts of one or more $C_3$ to $C_{10}$ alpha-olefins to a polymerization reactor;

b) contacting the ethylene, the Ziegler catalyst, the fresh aluminum alkyl co-catalyst, the diluent and optionally the hydrogen and the $C_3$ to $C_{10}$ alpha-olefins in the first polymerization reactor at a reactor temperature from 60° C. to 95° C. and a reactor pressure from 0.15 MPa to 3 MPa, thereby forming a slurry product comprising particulate polyethylene and a suspension medium;

c) withdrawing the slurry product from the reactor;

d) feeding the slurry product to a separator;

e) separating in the separator the particulate polyethylene from the suspension medium;

f) recycling at least a part of the suspension medium separated from the slurry product in the separator as recycled suspension medium to the polymerization reactor;

g) determining the concentration of aluminum alkyl co-catalyst in the recycled suspension medium; and h) adjusting the amount of fresh aluminum alkyl co-catalyst fed to the polymerization reactor to maintain a targeted aluminum alkyl co-catalyst concentration in the recycled suspension medium.

The polyethylene slurry production process may be carried out in multiple reactors, which can be operated in parallel or in series. It is possible to conduct the polyethylene slurry production process in a reactor cascade system, i.e. in reactors which are operated in series. Such a reactor cascade system can have two, three or more reactors. In an embodiment of the present disclosure, the process is carried out in a three-reactor cascade process operated in series.

Thus, in an embodiment the subject matter of the present disclosure relates to a slurry polymerization process for the preparation of polyethylene comprising:

a) feeding ethylene, a Ziegler catalyst, fresh aluminum alkyl co-catalyst and a diluent which is selected from fresh diluent, recycled suspension medium comprising a concentration of aluminum alkyl co-catalyst, and mixtures thereof, and optionally hydrogen and/or one or more $C_3$ to $C_{10}$ alpha-olefins to a first polymerization reactor of a reactor cascade of two reactors;

b) contacting in the first polymerization reactor at a reactor temperature from 60° C. to 95° C. and a reactor pressure from 0.15 MPa to 3 MPa, the ethylene, Ziegler catalyst, fresh aluminum alkyl co-catalyst, diluent and optionally hydrogen and/or $C_3$ to $C_{10}$ alpha-olefins in the first polymerization reactor at a reactor temperature from 60° C. to 95° C. and a reactor pressure from 0.15 MPa to 3 MPa, thereby forming a slurry product comprising particulate polyethylene and a suspension medium;

c) withdrawing the slurry product from the first polymerization reactor;

d) feeding the slurry product to the second polymerization reactor of the reactor cascade, feeding additional amounts of ethylene, diluent selected from fresh diluent, recycled suspension medium comprising a concentration of aluminum alkyl co-catalyst, and mixtures thereof, and optionally additional amounts of hydrogen and of $C_3$ to $C_{10}$ alpha-olefins to the second polymerization reactor;

contacting the slurry product fed to the polymerization reactor and the additional amounts of ethylene, diluent, and optionally hydrogen and $C_3$ to $C_{10}$ alpha-olefins in the second polymerization reactor at a reactor temperature from 60° C. to 95° C. and a reactor pressure from 0.15 MPa to 3 MPa, thereby forming an additional amount of polyethylene in the slurry product;

and withdrawing the slurry product from the second polymerization reactor;

e) feeding the slurry product withdrawn from the second polymerization reactor of the reactor cascade to a separator;

f) separating the particulate polyethylene from the suspension medium in the separator;

g) recycling at least a part of the suspension medium separated from the slurry product in the separator as recycled suspension medium to at least one polymerization reactor of the reactor cascade;

h) determining the concentration of aluminum alkyl co-catalyst in the recycled suspension medium; and i) adjusting the amount of fresh aluminum alkyl co-catalyst fed to the first polymerization reactor of the reactor cascade to maintain a targeted aluminum alkyl co-catalyst concentration in the recycled suspension medium.

In another embodiment, the subject matter of the present disclosure relates to a slurry polymerization process for the preparation of polyethylene comprising:

a) feeding amounts of ethylene, a Ziegler catalyst, fresh aluminum alkyl co-catalyst and a diluent which is selected from fresh diluent, recycled suspension medium comprising a concentration of aluminum alkyl co-catalyst, and mixtures thereof, and optionally amounts of hydrogen and/or amounts of one or more $C_3$ to $C_{10}$ alpha-olefins to a first polymerization reactor of a reactor cascade of three reactors;

b) contacting the ethylene, Ziegler catalyst, fresh aluminum alkyl co-catalyst, diluent and optionally hydrogen and/or $C_3$ to $C_{10}$ alpha-olefins in the first polymerization reactor at a reactor temperature from 60° C. to 95° C. and a reactor pressure from 0.15 MPa to 3 MPa, thereby forming a slurry product comprising particulate polyethylene and a suspension medium;

c) withdrawing the slurry product from the first polymerization reactor;

d) feeding the slurry product to the second polymerization reactor of the reactor cascade, feeding additional amounts of ethylene, diluent selected from fresh diluent, recycled suspension medium comprising a concentration of aluminum alkyl co-catalyst, and mixtures thereof, and optionally additional amounts of hydrogen and/or $C_3$ to $C_{10}$ alpha-olefins to the second polymerization reactor;

contacting the slurry product fed to the polymerization reactor and the additional amounts of ethylene, diluent, and optionally hydrogen and $C_3$ to $C_{10}$ alpha-olefins in the second polymerization reactor at a reactor temperature from 60° C. to 95° C. and a reactor pressure from 0.15 MPa to 3 MPa, thereby forming an additional amount of polyethylene in the slurry product;

and withdrawing the slurry product from the second polymerization reactor;

e) feeding the slurry product withdrawn from the second polymerization reactor to the third polymerization reactor of the reactor cascade, feeding additional amounts of ethylene, diluent selected from fresh diluent, recycled suspension medium comprising a concentration of aluminum alkyl co-catalyst, and mixtures thereof, and optionally additional amounts of hydrogen and/or $C_3$ to $C_{10}$ alpha-olefins to the third polymerization reactor;

contacting the slurry product fed to the polymerization reactor and the additional amounts of ethylene, diluent, and optionally hydrogen and/or $C_3$ to $C_{10}$ alpha-olefins in the third polymerization reactor at a reactor temperature from 60° C. to 95° C. and a reactor pressure from 0.15 MPa to 3 MPa, thereby forming an additional amount of polyethylene in the slurry product;

and withdrawing the slurry product from the third polymerization reactor;

f) feeding the slurry product withdrawn from the third polymerization reactor of the reactor cascade to a separator;

g) separating the particulate polyethylene from the suspension medium in the separator;

h) recycling at least a part of the suspension medium separated from the slurry product in the separator as recycled suspension medium to at least one polymerization reactor of the reactor cascade;

i) determining the concentration of aluminum alkyl co-catalyst in the recycled suspension medium; and j) adjusting the amount of fresh aluminum alkyl co-catalyst fed to the first polymerization reactor of the reactor cascade to maintain a targeted aluminum alkyl co-catalyst concentration in the recycled suspension medium.

When conducting the polyethylene slurry production process in multiple reactors, catalyst may be fed to each reactor individually in parallel, or, in the alternative, to the first polymerization reactor in a cascaded multi-reactor system, where catalyst from the first polymerization reactor flows to the second polymerization reactor, and then to subsequent polymerization reactors in the respective reactor slurry products. When the operation is in parallel, the slurry product withdrawn from the polymerization reactor of the one polymerization reactor set-up reactor or, if the slurry polymerization process is conducted in a reactor cascade, the slurry product withdrawn from the last polymerization reactor of the cascade, is combined as a first slurry product comprising a first suspension medium and a first particulate polyethylene, with at least one additional slurry product comprising a second suspension medium and a second particulate polyethylene, thereby forming a combined slurry product, the combined slurry product is fed to the separator, thereby separating, in the separator, the combined particulate polyethylene comprising the first particulate polyethylene and the second particulate polyethylene from the combined suspension medium comprising the first suspension medium and the second suspension medium. At least a part of the combined suspension medium separated from the combined slurry product is recycled as recycled suspension medium to the polymerization reactors of the one polymerization reactor set-up or to at least one polymerization reactor of the reactor cascade. When the operation is in parallel, the polyethylene slurry production process may be carried out in a way that all polymerization reactors of the reactor system operate in parallel, i.e. that catalyst is fed to each of the polymerization reactors.

Diluent fed to the reactor can either be fresh diluent or that which has been separated from the particulate polyethylene in the reactor slurry and then directly recycled, i.e., the recycled suspension medium, or combinations thereof. The fresh diluent can either be new, unprocessed material or diluent previously separated from the reactor slurry that has been processed to remove impurities; for example, low boiling components or waxes. Any combination of recycled suspension medium and fresh diluent may be fed to the polymerization reactors in a multi-reactor system when operating in series, or each of the reactors when operating in parallel. The suspension medium separated from the particulate polyethylene in the separator and the recycled suspension medium comprises diluent, aluminum alkyl co-catalyst, comonomers such as 1-butene, and waxes. The 1-butene may be present at levels of 0% to 5%. The waxes may be present in an amount from 0% to 5%. In some embodiments, the recycled suspension medium has a concentration of aluminum alkyl co-catalyst which has not reacted with components of the polymerization mixture in the one or more polymerization reactors or with impurities in the components of the polymerization mixture. The concentration of aluminum in the recycled suspension medium may be from 0.05 mmol/l to 3 mmol/l, or from 0.5 mmol/l to 2 mmol/l. When operating in a cascade mode, the diluent fed to the first polymerization reactor of the reactor cascade system may be fresh diluent and recycled suspension medium, optionally in combination with fresh diluent, is fed to the subsequent polymerization reactors. In an embodiment of the present disclosure, the diluent fed to the first polymerization reactor of the reactor cascade system is fresh diluent and the diluent fed to the subsequent polymerization reactors is recycled suspension medium.

The polyethylene polymers produced by the polymerization process may be high density polyethylene (HDPE) resins which may have a density within the range of from 0.935 g/cm$^3$ to 0.970 g/cm$^3$. The density may be within the range of from 0.94 g/cm$^3$ to 0.970 g/cm$^3$ or the density is within the range of 0.945 g/cm$^3$ to 0.965 g/cm$^3$. Density may be measured according to DIN EN ISO 1183-1:2004, Method A (Immersion) with compression molded plaques of 2 mm thickness which were prepared with a defined thermal history: pressed at 180° C., 20 MPa for 8 min with subsequent crystallization in boiling water for 30 min.

The HDPE resin may have a melt index ($MI_{21.6}$) from 1 dg/min to 100 dg/min, or from 1.5 dg/min to 50 dg/min, or from 2 dg/min to 35 dg/min. The $MI_{21.6}$ is measured according to DIN EN ISO 1133:2005, condition G at a temperature of 190° C. under a load of 21.6 kg.

The HDPE resin may be an ethylene homopolymer or copolymer that comprises from 90 wt. % to 99.8 wt. % of recurring units of ethylene and from 0.2 wt. % to 10 wt. % of recurring units of a $C_3$ to $C_{10}$ alpha-olefin. The $C_3$ to $C_{10}$ α-olefins may include propylene, 1-butene, 1-pentene, 1-hexene, 4-methyl-1-pentene, and 1-octene, and mixtures thereof.

Catalyst

The polymerization may be carried out using Ziegler catalysts, i.e. catalysts of the Ziegler type which are also designated as Ziegler-Natta catalysts, comprising a compound of titanium or vanadium, a compound of magnesium and optionally a particulate inorganic oxide as support.

The titanium compounds may be selected from the halides or alkoxides of trivalent or tetravalent titanium, with titanium alkoxy halogen compounds or mixtures of various titanium compounds. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-i-}C_3H_7)Cl_3$, $Ti(O\text{-n-}C_4H_9)Cl_3$, $Ti(OC_2H_5)Br_3$, $Ti(O\text{-n-}C_4H_9)Br_3$, $Ti(OCH_3)_2Cl_2$, $Ti(OC_2H_5)_2CL_2$, $Ti(O\text{-n-}C_4H_9)_2Cl_2$, $Ti(OC_2H_5)_2Br_2$, $Ti(OCH_3)_3Cl$, $Ti(OC_2H_5)_3Cl$, $Ti(O\text{-n-}C_4H_9)_3Cl$, $Ti(OC_2H_5)_3Br$, $Ti(OCH_3)_4$, $Ti(OC_2H_5)_4$ and $Ti(O\text{-n-}C_4H_9)_4$. In an embodiment of the preset disclosure, the titanium compounds may comprise chlorine as the halogen. In an embodiment, the titanium halides may comprise only halogen in addition to titanium or may be titanium chlorides such as titanium tetrachloride. The vanadium compounds may be the vanadium halides, vanadium oxyhalides, vanadium alkoxides or vanadium acetylacetonates. In an embodiment, the vanadium compounds are in an oxidation state of 3 to 5.

In the production of the solid component, at least one compound of magnesium may be used. These compounds may be halogen-comprising magnesium compounds such as magnesium halides including chlorides and bromides; or these compounds may be magnesium compounds from which the magnesium halides can be obtained in a customary way, e.g. by reaction with halogenating agents. In an embodiment of the present disclosure, the halogens are selected from chlorine, bromine, iodine and fluorine or mixtures of two or more halogens, or in the alternative, the halogens are chlorine or bromine, or the halogens are chlorine.

Possible halogen-containing magnesium compounds are magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. The halogenating agents may be, for example, halogens, hydrogen halides, $SiCl_4$ or $CCl_4$. In one embodiment, chlorine or hydrogen chloride is the halogenating agent.

Examples of halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. In one embodiment, the halogen-free compounds of magnesium are n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

The magnesium compounds for producing the particulate solids may be, apart from magnesium dichloride or magnesium dibromide, di($C_1$-$C_{10}$-alkyl)magnesium compounds. In one embodiment, the Ziegler catalyst comprises a transition metal selected from titanium, zirconium, vanadium, and chromium.

The Ziegler catalyst may be added to the slurry reactor by first mixing the catalyst with the diluent used, such as hexane, in a mixing tank to form a slurry which may be pumped. The concentration of catalyst in the catalyst slurry pumped to the slurry polymerization reactor may be from 10 mmol/L to 150 mmol/L, with respect to the titanium content of the catalysts compound. A positive displacement pump, such as a membrane pump, can be used to transfer the catalyst slurry to the slurry polymerization reactor.

Co-Catalyst

Catalysts of the Ziegler type are polymerized in the presence of aluminum alkyl co-catalyst activators. The aluminum alkyls may be selected from trialkylaluminum compounds. In some embodiments, the aluminum alkyl compounds are selected from trimethylaluminum (TMA), triethylaluminum (TEAL), tri-isobutylaluminum (TIBAL), and tri-n-hexylaluminum (TNHAL). In one embodiment, the aluminum alkyl is TEAL.

Fresh aluminum alkyl co-catalyst can be added to the slurry reactor as such. In an embodiment of the present disclosure, the aluminum alkyl co-catalyst is added by first mixing the aluminum alkyl compound with the diluent used, such as hexane, in a mixing tank. The concentration of aluminum alkyl co-catalyst in the solution pumped to the slurry polymerization reactor may be from 50 mmol/L to 600 mmol/L. A positive displacement pump, such as a membrane pump may be used to transfer the aluminum alkyl co-catalyst to the slurry polymerization reactor.

Ethylene

The ethylene for use in the ethylene slurry polymerization process can contain impurities such as oxygen-containing polar molecules. The oxygen-containing polar molecules can include water, alcohols, glycols, phenols, ethers, carbonyl compounds such as ketones, aldehydes, carboxylic acids, esters, fatty acids, and sulfur dioxides and trioxides, and carbonyl sulfide. When present, the oxygen-containing polar compounds are present in the ethylene in a range of 0.1 vol ppm to 50 vol ppm.

The aluminum alkyl compounds that are fed to the polymerization reactor are partially consumed in the ethylene polymerization reactions, where as discussed above the aluminum alkyl co-catalyst activates the Ti or V sites on the catalyst, or which can be partially deactivated by reaction with the oxygen-containing polar compounds that enter the slurry polymerization reactor with the ethylene or other feed streams like hexane, 1-butene and hydrogen. The oxygen in these impurities chemically combines with the aluminum alkyl co-catalyst, thereby interfering with the ethylene polymerization reactivity of the co-catalyst in the slurry polymerization reactor. Thus, the concentration of aluminum alkyl co-catalyst in the recycled suspension medium is lower than what would be expected from fresh aluminum alkyls of the same type and concentration, with the difference being a result of the consumption of aluminum alkyl co-catalyst due to reactions with the catalyst, and the deactivation caused by reaction with impurities of feed streams.

Figure 1:
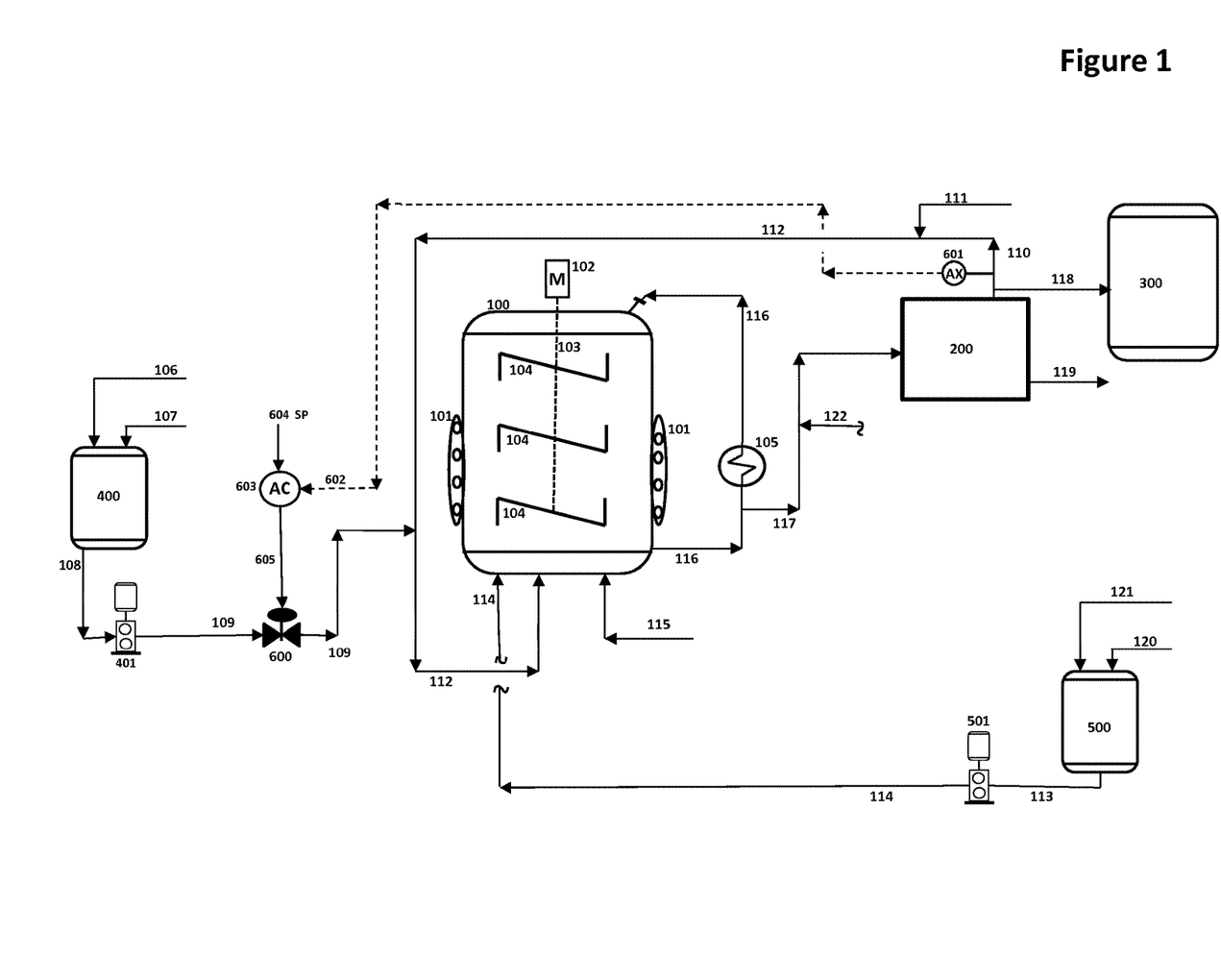
FIG. 1 depicts an illustrative flow diagram of an ethylene slurry polymerization process in a one-reactor system.

FIG. 1 illustrates an embodiment of the present disclosure with a single ethylene slurry polymerization reactor 100. Catalyst is introduced into catalyst mixing tank 500 through line 121, and diluent is introduced through line 120. The mixed catalyst slurry is pumped by pump 501 through lines 113 and 114 into slurry polymerization reactor 100, which is equipped with mixer motor 102, rotating shaft 103, impellers 104, and cooling jacket 101. The reactor slurry is routed for external cooling through cooler 105 using line 116, and then back to the ethylene slurry polymerization reactor 100.

An aluminum alkyl co-catalyst feed stream is prepared by adding to co-catalyst mixing tank 400 a fresh aluminum alkyl material through line 106 and diluent through line 107. The mixture is pumped through lines 108 and 109 by diaphragm pump 401 to co-catalyst control valve 600.

The diluent feed stream is composed of recycled suspension medium pumped through line 110, or fresh diluent pumped through line 111, or mixtures thereof that is fed to ethylene polymerization reactor 100 through line 112.

The concentration of aluminum alkyl co-catalyst(s) in the recycled suspension medium may be from 0.05 mmol/l to 3 mmol/l, or from 0.5 mmol/l to 2 mmol/l. This value can be obtained by calorimetric measurements where tert-butanol is added to a sample of the recycled suspension medium, with the heat rise corresponding to the concentration of aluminum alkyl co-catalyst. Such measurement systems are commercially available from Bilfinger Maintenance Süd GmbH, Frankfurt am Main, Germany.

Ethylene and comonomers are added to ethylene slurry polymerization reactor 100 through line 115.

The slurry product is withdrawn from the ethylene polymerization reactor 100 via line 117 and is routed to separation device 200, where the suspension medium is separated from the polyethylene. The separation device 200 may be any separator capable of separating suspension medium from particulate polymer at the temperatures and pressures involved. In one embodiment, the separation device is selected from centrifuges, decanters, pressure filters and combinations thereof. In one embodiment of the present disclosure, the separator is a centrifuge.

The suspension medium contains diluent, comonomers such as 1-butene, waxes, and a concentration of unreacted aluminum alkyl co-catalyst. The polyethylene is directed to a finishing section via line 119 for further processing, including without limitation hydrocarbon removal, and compounding with various additives. The separated suspension medium is, at least partly, directly recycled back to ethylene slurry polymerization reactor 100 through lines 110 and 112, with excess suspension medium being routed to holding tank 300 through line 118. Fresh diluent may also be added to the diluent feed line 110 through line 111. The fresh diluent may be new, unprocessed diluent or purified diluent obtained from holding tank 300 that has been processed to remove impurities, for example low boiling components or waxes.

Fresh aluminum alkyl co-catalyst is delivered to control valve 600 by pump 401 through line 109 in an amount sufficient to maintain a level of aluminum alkyl co-catalyst at a target concentration. Analysis transducer 601 is adapted to take samples of the recycled suspension medium from line 110 and to deliver, in response to the analysis of the aluminum alkyl-containing suspension medium, an aluminum alkyl compound concentration signal 602 which is representative of the weight fraction of aluminum alkyl co-catalyst in the recycled suspension medium flowing through line 110. Signal 602 is provided as a process variable input to analyzer controller 603. Analyzer controller 603 is also provided with a set point signal 604 which is representative of the desired aluminum alkyl compound concentration in the recycled suspension medium flowing in line 110. In response to signal 602, analyzer controller 603 provides an output signal 605 which is responsive to the difference between signals 602 and 604. Signal 605 is scaled so as to be representative of the position of control valve 600 which is operably located in line 109, required to maintain the actual aluminum alkyl compound concentration of the recycled suspension medium flowing in line 110 substantially equal to the desired concentration represented by signal 604. Signal 605 is provided from the analyzer controller 603 as a control signal for control valve 600, and the control valve 600 is manipulated in response thereto. The control valve can further open to increase the amount of fresh aluminum alkyl co-catalyst flowing to ethylene slurry polymerization reactor 100 or further close to restrict that flow.

While FIG. 1 illustrates a single reactor, the subject matter of the present disclosure also includes systems where multiple reactors are running in parallel. In this way, feed streams would be routed separately to each reactor and the aluminum concentration would separately be controlled by adjusting the flow of fresh aluminum alkyl co-catalyst to each reactor. Slurry product from the other reactors operating in parallel would be routed to separator 200 through line 122. Similarly to reactor 100, the combined slurry product would be separated in separator 200.

Figure 2:
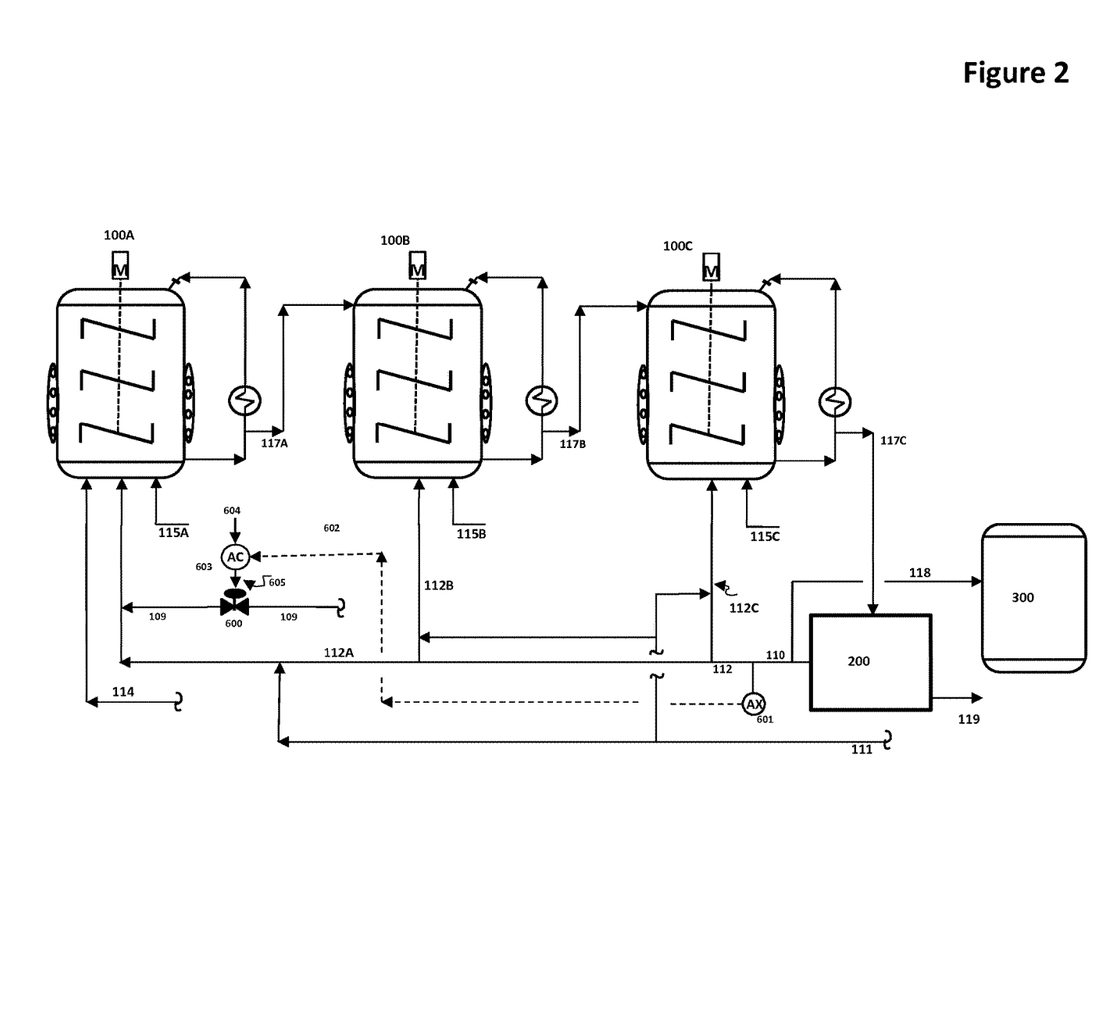
FIG. 2 depicts an illustrative flow diagram of an ethylene slurry polymerization process in a three-reactor system.

FIG. 2 illustrates an alternative embodiment of the process of the present disclosure, as a three-reactor system running in series, i.e. as a cascade. Catalyst slurry prepared as previously described flows through line 114 to ethylene slurry polymerization reactor 100A.

An aluminum alkyl co-catalyst feed stream is prepared as described above and flows through line 109 to control valve 600. The diluent feed stream is fed to ethylene polymerization reactor 100A through line 112A. Ethylene and comonomers are added to reactors 100A, 100B and 100C through lines 115A, 115B, and 115C, respectively.

The diluent feed stream to the reactor can be recycled suspension medium, fresh diluent or mixtures of the two, where the diluent may be selected from hexane and isobutane.

The reactor slurry leaves the ethylene slurry polymerization reactor 100A via line 117A and is routed to ethylene slurry polymerization reactor 100B. The product slurry from reactor 100B then leaves reactor 100B and is routed to reactor 100C through line 117B. The product slurry from reactor 100C then leaves reactor 100C via line 117C and is routed to separation device 200, where the suspension medium is separated from the solid particulate polyethylene. The polyethylene is directed to a finishing section via line 119 for further processing, including without limitation hydrocarbon removal and compounding. Recycled suspension medium is directly routed back to the ethylene slurry polymerization reactors 100A, 100B and/or 100C through lines 110, and 112A, with excess suspension medium being routed to holding tank 300 via line 118. Fresh diluent may also be added to the suspension medium recycle line 110 through line 111. The fresh diluent may either be new, unprocessed diluent or purified diluent obtained from holding tank 300 that has been processed to remove impurities.

Fresh aluminum alkyl co-catalyst is delivered to control valve 600 through line 109, in an amount sufficient to maintain a concentration of aluminum alkyl co-catalyst of 0.05 mmol/L to 3 mmol/L in the recycled suspension medium. This result is achieved by control valve 600. Analysis transducer 601 is adapted to take samples of the recycled suspension medium from line 110 and to deliver, in response to the analysis of the aluminum alkyl-containing suspension medium, an aluminum alkyl compound concentration signal 602 which is representative of the weight fraction of aluminum alkyl compound in the recycled suspension medium flowing through line 110. Signal 602 is provided as a process variable input to analyzer controller 603. Analyzer controller 603 is also provided with a set point signal 604 which is representative of the desired aluminum alkyl co-catalyst concentration in the recycled suspension medium flowing in line 110. In response to signal 602, analyzer controller 603 provides an output signal 605 which is responsive to the difference between signals 602 and 604. Signal 605 is scaled so as to be representative of the position of control valve 600 which is operably located in line 109, required to maintain the actual aluminum alkyl compound concentration of the recycled suspension medium flowing in line 110 substantially equal to the desired concentration represented by signal 604. Signal 605 is provided from the analyzer controller 603 as a control signal for control valve 600, and the control valve 600 is manipulated in response thereto. The control valve can further open to increase the amount of fresh aluminum alkyl co-catalyst flowing to ethylene slurry polymerization reactor 100A, or further close to restrict that flow.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

We claim:

1. A slurry polymerization process for the preparation of polyethylene in a one polymerization reactor set-up or in a reactor cascade of two or more polymerization reactors comprising the steps of:

a) feeding ethylene, a Ziegler catalyst, fresh aluminum alkyl co-catalyst, a diluent selected from fresh diluent, recycled suspension medium comprising a concentration of aluminum alkyl co-catalyst and mixtures thereof, and optionally amounts of hydrogen and optionally amounts of one or more $C_3$ to $C_{10}$ alpha-olefins to a polymerization reactor;

b) contacting the ethylene, Ziegler catalyst, fresh aluminum alkyl co-catalyst, diluent and optionally the hydrogen and the $C_3$ to $C_{10}$ alpha-olefins in the polymerization reactor at a reactor temperature from 60° C. to 95° C. and a reactor pressure from 0.15 MPa to 3 MPa, thereby forming a slurry product comprising particulate polyethylene and a suspension medium;

c) withdrawing the slurry product from the polymerization reactor;

d) optionally feeding the slurry product to a second polymerization reactor of the reactor cascade, feeding additional amounts of ethylene, diluent selected from fresh diluent, recycled suspension medium comprising a concentration of aluminum alkyl co-catalyst, and mixtures thereof, and optionally additional amounts of hydrogen and of $C_3$ to $C_{10}$ alpha-olefins to the polymerization reactor; contacting the slurry product fed to the polymerization reactor and the additional amounts of ethylene, diluent, and optionally hydrogen and $C_3$ to $C_{10}$ alpha-olefins in the polymerization reactor at a reactor temperature from 60° C. to 95° C. and a reactor pressure from 0.15 MPa to 3 MPa, thereby forming an additional amount of polyethylene in the slurry product;

and withdrawing the slurry product from the polymerization reactor;

e) optionally feeding the slurry product obtained in step d) to a third polymerization reactor of the reactor cascade and repeating the activities of step d);

f) optionally repeating step e) for additional polymerization reactors of the reactor cascade;

g) feeding the slurry product withdrawn from the polymerization reactor of the one polymerization reactor set-up or from the last polymerization reactor of the reactor cascade to a separator;

h) separating in the separator the particulate polyethylene from the suspension medium;

i) recycling at least a part of the suspension medium separated from the slurry product in the separator as recycled suspension medium to the polymerization reactor of the one polymerization reactor set-up or to at least one polymerization reactor of the reactor cascade;

j) determining the concentration of aluminum alkyl co-catalyst in the recycled suspension medium; and k) adjusting the amount of fresh aluminum alkyl co-catalyst fed to the polymerization reactor of the one polymerization reactor set-up or to the first polymerization reactor of the reactor cascade to maintain a targeted aluminum alkyl co-catalyst concentration in the recycled suspension medium.

2. The process of claim 1, wherein the targeted aluminum alkyl co-catalyst concentration in the recycled suspension medium is from 0.05 mmol/L to 3 mmol/L.

3. The process of claim 1, wherein the fresh aluminum alkyl co-catalyst comprises one or more trialkylaluminum compounds.

4. The process of claim 3 wherein the trialkylaluminum compounds are selected from trimethylaluminum, triethylaluminum, tri-isobutylaluminum, and tri-n-hexylaluminum.

5. The process of claim 4 wherein the fresh aluminum alkyl co-catalyst comprises tri-isobutylaluminum or triethylaluminum.

6. The process of claim 5 wherein the fresh aluminum alkyl co-catalyst comprises triethylaluminum.

7. The process of claim 1, wherein the slurry polymerization process is carried out in a one polymerization reactor set-up.

8. The process of claim 1, wherein the slurry polymerization process is carried out in a reactor cascade.

9. The process of claim 8, wherein the reactor cascade system has two reactors.

10. The process of claim 8, wherein the reactor cascade system has three reactors.

11. The process of claim 8, wherein the diluent fed to the first reactor of the reactor cascade is fresh diluent.

12. The process of claim 1, wherein the slurry product withdrawn from the polymerization reactor of the one polymerization reactor set-up or from the last polymerization reactor of the reactor cascade is combined as a first slurry product comprising a first particulate polyethylene and a first suspension medium with at least one additional slurry product comprising a second particulate polyethylene and a second suspension medium, thereby forming a combined slurry product, and the combined slurry product is fed to the separator, thereby separating in the separator the combined particulate polyethylene comprising the first polyethylene and the second polyethylene from the combined suspension medium comprising the first suspension medium and the second suspension medium and recycling at least a part of the combined suspension medium separated from the combined slurry product as recycled suspension medium to the polymerization reactor of the one polymerization reactor set-up or to at least one polymerization reactor of the reactor cascade.

13. The process of claim 1, wherein the polyethylene has a density in the range of from 0.935 g/cm$^3$ to 0.970 g/cm$^3$.

14. A slurry polymerization process for the preparation of polyethylene in a one polymerization reactor set-up or in a reactor cascade of two or more polymerization reactors comprising the steps of:

a) feeding amounts of ethylene, a Ziegler catalyst, fresh aluminum alkyl co-catalyst, a diluent which is selected from fresh diluent, recycled suspension medium comprising a concentration of aluminum alkyl co-catalyst, and mixtures thereof, and optionally amounts of hydrogen and optionally amounts of one or more $C_3$ to $C_{10}$ alpha-olefins to a polymerization reactor;

b) contacting the amounts of the ethylene, the Ziegler catalyst, the fresh aluminum alkyl co-catalyst, the diluent and optionally the hydrogen and the $C_3$ to $C_{10}$ alpha-olefins in the polymerization reactor at a reactor temperature from 60° C. to 95° C. and a reactor pressure from 0.15 MPa to 3 MPa, thereby forming a slurry product comprising particulate polyethylene and a suspension medium;

c) withdrawing the slurry product from polymerization the reactor;

d) optionally feeding the slurry product to a second polymerization reactor of the reactor cascade, feeding additional amounts of ethylene, diluent selected from fresh diluent, recycled suspension medium comprising a concentration of aluminum alkyl co-catalyst, and mixtures thereof, and optionally additional amounts of hydrogen and of $C_3$ to $C_{10}$ alpha-olefins to the polymerization reactor;

contacting the slurry product fed to the polymerization reactor and the additional amounts of ethylene, diluent, and optionally hydrogen and $C_3$ to $C_{10}$ alpha-olefins in the polymerization reactor at a reactor temperature from 60° C. to 95° C. and a reactor pressure from 0.15 MPa to 3 MPa, thereby forming an additional amount of polyethylene in the slurry product;

and withdrawing the slurry product from the polymerization reactor;

e) optionally feeding the slurry product obtained in step d) to a third polymerization reactor of the reactor cascade and repeating the activities of step d);

f) optionally repeating step e) for additional polymerization reactors of the reactor cascade;

g) feeding the slurry product withdrawn from the polymerization reactor of the one polymerization reactor set-up or from the last polymerization reactor of the reactor cascade to a separator;

h) separating the particulate polyethylene from the suspension medium in the separator;

i) recycling at least a part of the suspension medium separated from the slurry product in the separator as recycled suspension medium to the polymerization reactor of the one polymerization reactor set-up or to at least one polymerization reactor of the reactor cascade;

j) determining the concentration of aluminum alkyl co-catalyst in the recycled suspension medium by calorimetric measurements; and k) adjusting the amount of fresh aluminum alkyl co-catalyst fed to the polymerization reactor of the one polymerization reactor set-up or to the first polymerization reactor of the reactor cascade to maintain a targeted aluminum alkyl co-catalyst concentration in the recycled suspension medium.

15. The process of claim 14, wherein the fresh aluminum alkyl co-catalyst comprises one or more trialkylaluminum compounds.

16. The process of claim 15, wherein the trialkylaluminum compounds are selected from trim ethyl aluminum, tri ethyl aluminum, tri-isobutylaluminum, and tri-n-hexylaluminum.

17. The process of claim 14, wherein the slurry polymerization process is carried out in a one polymerization reactor set-up.

18. The process of claim 14, wherein the slurry polymerization process is carried out in a reactor cascade.

19. A slurry polymerization process for the preparation of polyethylene in a one polymerization reactor set-up or in a reactor cascade of two or more polymerization reactors comprising the steps of:
a) feeding ethylene, a Ziegler catalyst, fresh aluminum alkyl co-catalyst, a diluent which is selected from fresh diluent, recycled suspension medium comprising a concentration of aluminum alkyl co-catalyst, and mixtures thereof, and optionally amounts of hydrogen and optionally amounts of one or more $C_3$ to $C_{10}$ alpha-olefins to a polymerization reactor;
b) contacting the ethylene, the Ziegler catalyst, the fresh aluminum alkyl co-catalyst, the diluent and optionally the hydrogen and the $C_3$ to $C_{10}$ alpha-olefins in the polymerization reactor at a reactor temperature from 60° C. to 95° C. and a reactor pressure from 0.15 MPa to 3 MPa, thereby forming a slurry product comprising particulate polyethylene and a suspension medium;
c) withdrawing the slurry product from polymerization the reactor;
d) optionally feeding the slurry product to a second polymerization reactor of the reactor cascade, feeding additional amounts of ethylene, of diluent selected from fresh diluent, recycled suspension medium comprising a concentration of aluminum alkyl co-catalyst, and mixtures thereof, and optionally additional amounts of hydrogen and of $C_3$ to $C_{10}$ alpha-olefins to the polymerization reactor;
contacting the slurry product fed to the polymerization reactor and the additional amounts of ethylene, diluent, and optionally hydrogen and $C_3$ to $C_{10}$ alpha-olefins in the polymerization reactor at a reactor temperature from 60° C. to 95° C. and a reactor pressure from 0.15 MPa to 3 MPa, thereby forming an additional amount of polyethylene in the slurry product;
and withdrawing the slurry product from the polymerization reactor;
e) optionally feeding the slurry product obtained in step d) to a third polymerization reactor of the reactor cascade and repeating the activities of step d);
f) optionally repeating step e) for additional polymerization reactors of the reactor cascade;
g) feeding the slurry product withdrawn from the polymerization reactor of the one polymerization reactor set-up or from the last polymerization reactor of the reactor cascade to a separator;
h) separating the particulate polyethylene from the suspension medium in the separator;
i) recycling at least a part of the suspension medium separated from the slurry product in the separator as recycled suspension medium to the polymerization reactor of the one polymerization reactor set-up or to at least one polymerization reactor of the reactor cascade;
j) determining the concentration of aluminum alkyl co-catalyst in the recycled suspension medium; and
k) adjusting the amount of fresh aluminum alkyl co-catalyst fed to the polymerization reactor of the one polymerization reactor set-up or to the first polymerization reactor of the reactor cascade to maintain a targeted aluminum alkyl co-catalyst concentration in the recycled suspension medium,
wherein the slurry polymerization process is carried out in a reactor cascade having three reactors.

20. The process of claim 19, wherein the diluent fed to the first reactor of the reactor cascade is fresh diluent.

* * * * *